United States Patent
Sanada et al.

(10) Patent No.: US 8,528,422 B2
(45) Date of Patent: Sep. 10, 2013

(54) TORQUE AND INDEX DETECTION APPARATUS

(75) Inventors: Takahiro Sanada, Kashihara (JP); Ken Okuyama, Hitachi (JP); Yukio Ikeda, Hitachi (JP); Yukitoshi Terasaka, Hitachi (JP)

(73) Assignee: JTEKT Corporation, Osaka-shi (JP)

( * ) Notice: Subject to any disclaimer, the term of this patent is extended or adjusted under 35 U.S.C. 154(b) by 192 days.

(21) Appl. No.: 13/231,127

(22) Filed: Sep. 13, 2011

(65) Prior Publication Data
US 2012/0060628 A1     Mar. 15, 2012

(30) Foreign Application Priority Data
Sep. 13, 2010   (JP) .................. 2010-204460

(51) Int. Cl.
*G01L 3/02*    (2006.01)
(52) U.S. Cl.
USPC ..................................... 73/862.335
(58) Field of Classification Search
USPC ................. 73/862.331–862.335
See application file for complete search history.

(56) References Cited

U.S. PATENT DOCUMENTS

| | | | | |
|---|---|---|---|---|
| 4,784,002 | A * | 11/1988 | Io .......................... | 73/862.331 |
| 6,763,733 | B2 * | 7/2004 | Tokumoto ............... | 73/862.333 |
| 6,928,887 | B2 * | 8/2005 | Nakane et al. .......... | 73/862.331 |
| 7,051,602 | B2 * | 5/2006 | Nakane et al. .......... | 73/862.333 |
| 7,287,440 | B1 * | 10/2007 | Maehara .................. | 73/862.322 |
| 7,424,830 | B2 * | 9/2008 | Matsusaki et al. ...... | 73/862.331 |
| 7,568,400 | B2 * | 8/2009 | Tokumoto et al. ....... | 73/862.333 |
| 7,602,173 | B2 * | 10/2009 | Reichert .................. | 324/207.13 |
| 7,886,619 | B2 * | 2/2011 | Kaoku et al. ............ | 73/862.331 |
| 7,954,389 | B2 * | 6/2011 | Maehara .................. | 73/862.333 |
| 2007/0132447 | A1 | 6/2007 | Reimer et al. | |
| 2008/0007251 | A1 | 1/2008 | Lee | |

FOREIGN PATENT DOCUMENTS

| | | |
|---|---|---|
| JP | A-2003-149062 | 5/2003 |
| JP | A-2005-069928 | 3/2005 |
| JP | A-2007-269281 | 10/2007 |
| JP | A-2010-014462 | 1/2010 |

OTHER PUBLICATIONS

Feb. 21, 2012 Extended Search Report issued in European Application No. 11181056.0.

* cited by examiner

*Primary Examiner* — Max Noori
(74) *Attorney, Agent, or Firm* — Oliff & Berridge, PLC

(57) ABSTRACT

A torque and index detection apparatus includes a torque sensing section that senses torque exerted on a connecting shaft connecting a first and second shafts by a pair of magnetic sensing elements whose magnetic sensing directions are opposite, and a reference rotational position sensing section that senses a reference rotational position of the second shaft by the magnetic sensing elements. The reference rotational position sensing section includes a pair of magnets provided in the circumferential direction of the second shaft with like magnetic poles facing each other, a first magnetic part that is located between the magnets and the magnetic sensing elements, rotates integrally with the second shaft, and forms a magnetic path for magnetic flux of the magnets in the reference rotational position, and a second magnetic part that is provided between the magnetic sensing elements, and passes the magnetic flux from the first magnetic part uniformly to the magnetic sensing elements.

6 Claims, 8 Drawing Sheets

TORQUE AND INDEX DETECTION APPARATUS

INCORPORATION BY REFERENCE

The disclosure of Japanese Patent Application No. 2010-204460 filed on Sep. 13, 2010 including the specification, drawings and abstract is incorporated herein by reference in its entirety.

BACKGROUND OF THE INVENTION

1. Field of the Invention

The invention relates to a compact torque and index detection apparatus that combines the functions of a torque sensor and an index sensor.

2. Description of Related Art

Electric power steering devices for a vehicle include a steering wheel with which the driver performs a steering operation, an input shaft rotated by the steering wheel, a connecting shaft (torsion bar) to which torque (steering torque) is applied by rotation of the input shaft, an output shaft rotated by the torque applied to the connecting shaft, a torque sensor that senses torque applied to the connecting shaft, and an auxiliary motor that is driven in accordance with the steering torque sensed by the torque sensor. The driving force of the auxiliary motor is transmitted to a steering structure connected to the output shaft to thereby assist the driver's steering operation.

In electric power steering devices, in addition to steering torque, the orientation of steered wheels (steering angle) that changes with the steering operation also may be sensed by a steering angle sensor.

An example of a technique that integrates a torque sensor and a steering angle sensor is described in Japanese Patent Application Publication No. 2007-269281. With regard to the torque sensor, JP-A-2007-269281 describes that the torque sensor includes a cylindrical magnet formed by a multipolar magnet provided on the input shaft and having N-poles and S-poles arranged alternately side by side in the circumferential direction, a pair of yoke rings made of a magnetic material which are provided on the output shaft and placed within the magnetic field of the cylindrical magnet to form a magnetic circuit, a pair of magnetic collecting rings made of a magnetic material which are magnetically coupled to the yoke rings and guide magnetic flux from the yoke rings to thereby collect the magnetic flux, and a magnetic sensing element (magnetic sensor) that senses the magnetic flux guided by the magnetic collecting rings, and that the torque sensor senses torque applied to the connecting shaft on the basis of the output of the magnetic sensing element. Also, with regard to the steering angle sensor, JP-A-2007-269281 describes that the steering angle sensor includes a pair of gears with different numbers of teeth which rotate in synchronization with rotation of the output shaft around two axes located in parallel to the output shaft, and a plurality of magnetic sensing elements that sense the rotation angles of the respective gears, and that the steering angle sensor senses steering angle on the basis of the combination of the rotation angles sensed by the respective magnetic sensing elements. The steering angle sensor as described in JP-A-2007-269281 is referred to as mechanical steering angle sensor.

Other than the mechanical steering angle sensor as described in JP-A-2007-269281, another type of steering angle sensor is an index-type steering angle sensor which sets a reference position for the rotational position of the output shaft, senses the number of the rotation of the output shaft by sensing (indexing) the presence of the output shaft in the reference rotational position, and uses the sensed rotational speed for sensing steering angle. For example, electric power steering devices are equipped with an auxiliary motor, and the relative angle of the output shaft can be obtained on the basis of the rotation angle of the auxiliary motor. In the case of using an index-type steering angle sensor, steering angle can be sensed by obtaining the absolute angle of the output shaft on the basis of this relative angle of the output shaft obtained from the auxiliary motor, and the number of the rotation of the output shaft sensed by sensing the presence of the output shaft in the reference rotational position.

By directing attention to the technique of an index-type steering angle sensor, the present inventors have conceived of installing a torque sensor and an index sensor serving as an index-type steering angle sensor together in an electric power steering device.

However, merely installing a torque sensor and an index sensor together means that two sensors are merely installed together, which not only increases the number of parts but also detracts from compactness.

SUMMARY OF THE INVENTION

Accordingly, it is an object of the invention to provide a torque and index detection apparatus that combines the functions of a torque sensor and an index sensor, and can contribute to reducing the number of parts and achieving compactness.

An aspect of the invention relates to a torque and index detection apparatus including a torque sensing section that senses torque exerted on a connecting shaft that connects a first shaft and a second shaft that are rotated by a steering operation, by a pair of magnetic sensing elements placed with their magnetic sensing directions opposite to each other, and a reference rotational position sensing section that senses a reference rotational position of the connecting shaft by the pair of magnetic sensing elements of the torque sensing section, in which the reference rotational position sensing section includes a pair of magnets provided in a circumferential direction of the second shaft with like magnetic poles facing each other, a first magnetic part that is located between the pair of magnets and the pair of magnetic sensing elements, is provided so as to rotate integrally with the second shaft, and forms a magnetic path for magnetic flux of the pair of magnets in the reference rotational position, and a second magnetic part that is provided between the pair of magnetic sensing elements, and passes the magnetic flux from the first magnetic part uniformly to the pair of magnetic sensing elements.

The torque sensing section may include a torque sensing magnet provided on the first shaft, the torque sensing magnet being a cylindrical magnet having N-poles and S-poles placed alternately at a predetermined pitch in a circumferential direction, a pair of magnetic yokes that are provided on the second shaft, and are provided so as to surround the torque sensing magnet to introduce magnetic flux from the torque sensing magnet in accordance with torque on the connecting shaft, a pair of magnetic collecting rings that are secured with spacing around a periphery of the pair of magnetic yokes, and introduce magnetic flux from the pair of magnetic yokes, and a pair of proximate sections that collect the magnetic flux introduced to the pair of magnetic collecting rings onto each of the pair of magnetic sensing elements, the pair of proximate sections being provided so as to respectively sandwich the pair of magnetic sensing elements that are placed between the pair of magnetic collecting rings side by side in a circumferential direction around the periphery of the magnetic collecting rings.

The second magnetic part may include a longitudinally extended section that is provided in a middle between the pair of magnetic sensing elements and above a rotation trajectory of the first magnetic part, and introduces magnetic flux from the first magnetic part, a first transversely extended section that is extended over the magnetic sensing elements along one of the magnetic collecting rings, at one end of the longitudinally extended section, and a second transversely extended section that is extended in parallel to the first transversely extended section toward the pair of magnetic sensing elements.

The torque and index detection apparatus may further include a third magnetic part that is placed between the pair of magnets facing each other, and guides magnetic flux to the first magnetic part.

According to this embodiment, because the same common member is used to combine the functions of a torque sensor and an index sensor, it is possible to provide a torque and index detection apparatus that is compact with a small number of parts.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, an embodiment of the invention will be described in detail with reference to the attached drawings.

Figure 1:
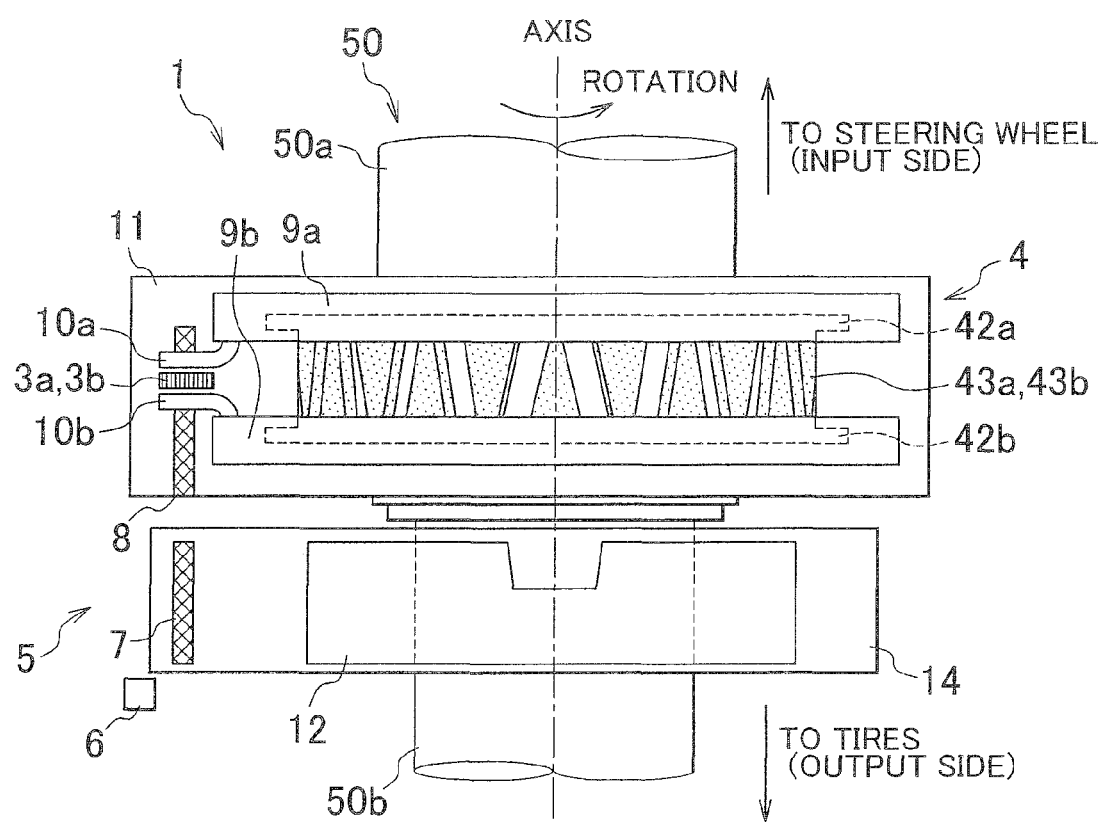
FIG. 1 is a side view of a torque and index detection apparatus in a reference rotational position which illustrates an embodiment of the invention.
Figure 2:
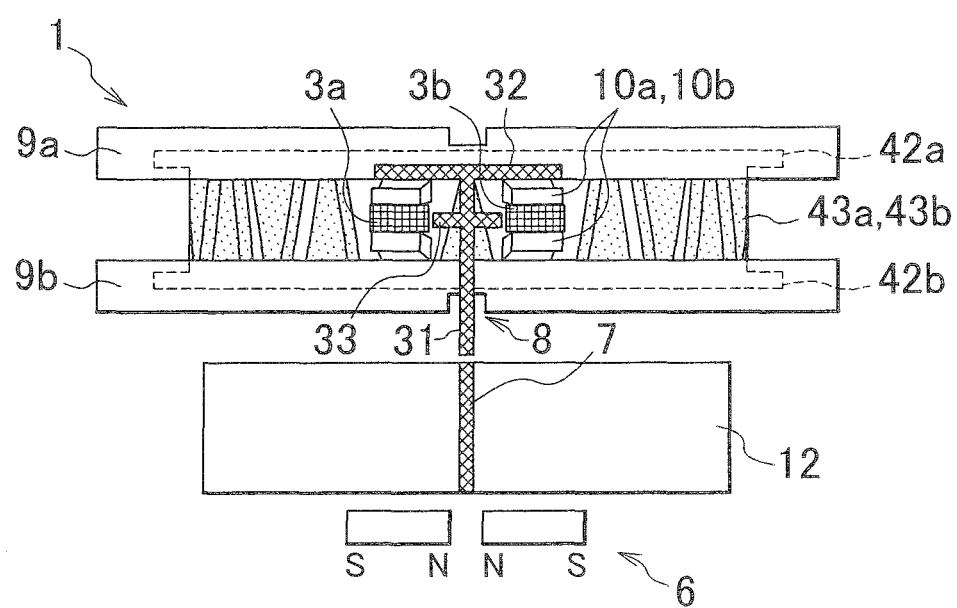
FIG. 2 is a front view of FIG. 1.
Figure 3:
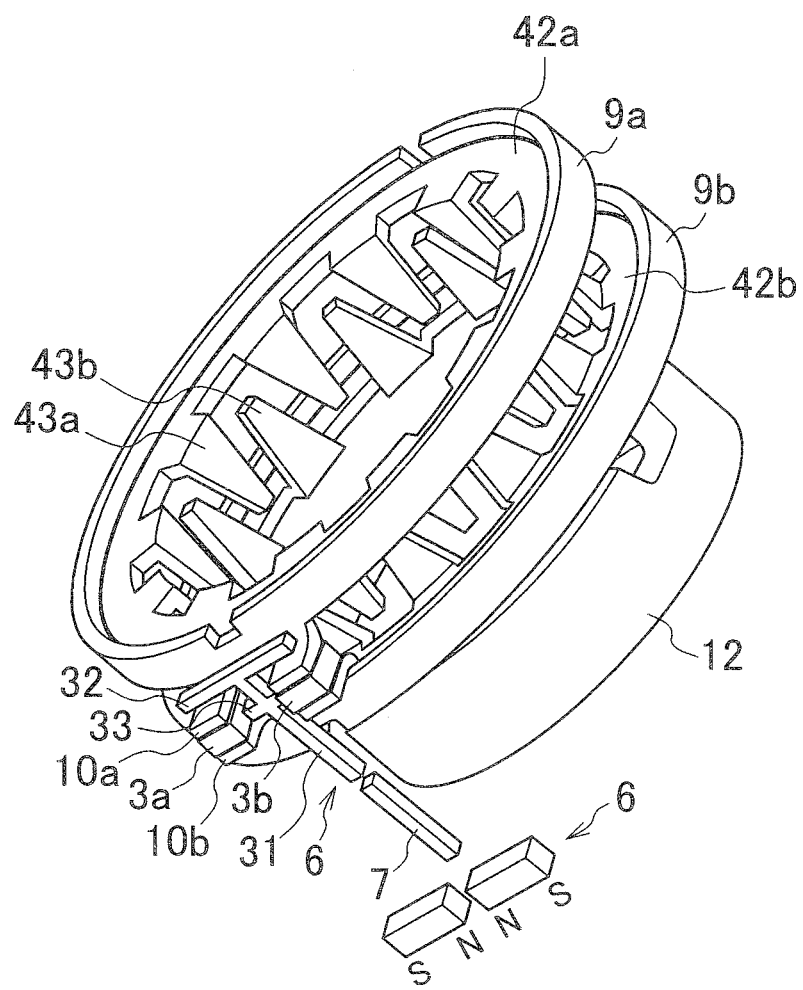
FIG. 3 is a perspective view of FIG. 1.
Figure 4A:
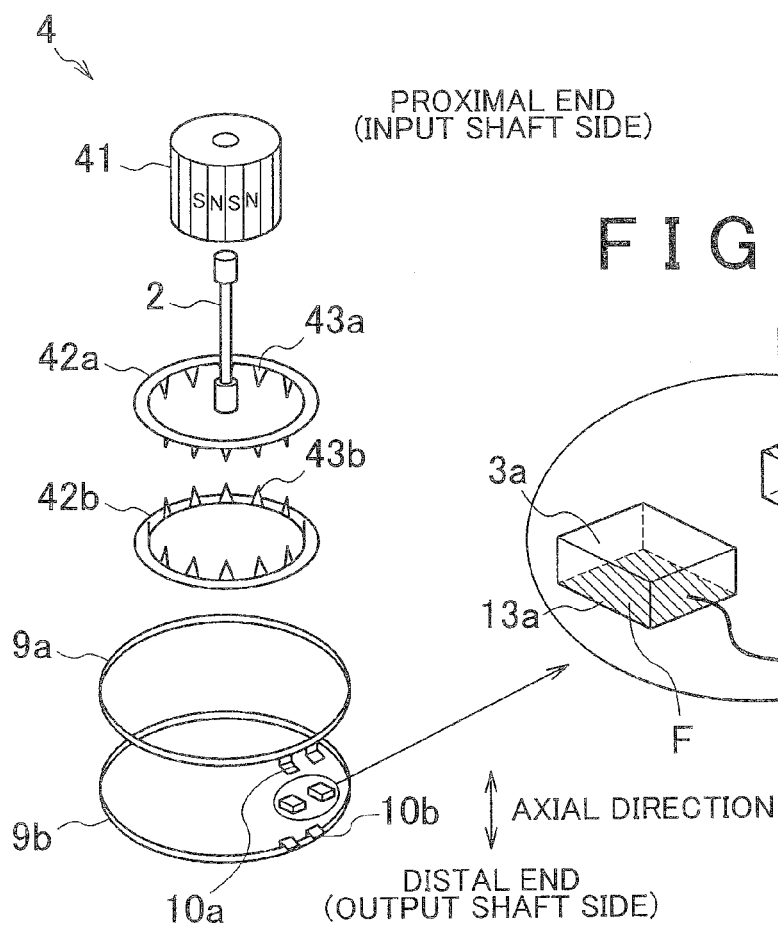
FIG. 4A is an exploded illustration of a torque sensing section of a torque and index detection apparatus according to the embodiment of the invention.
Figure 4B:
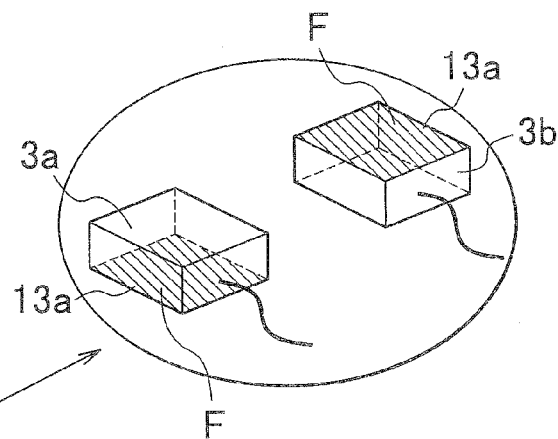
FIG. 4B is a partial enlarged view of FIG. 4A.

FIG. 1 is a side view of a torque and index detection apparatus in a reference rotational position according to this embodiment, FIG. 2 is a front view of FIG. 1, and FIG. 3 is a perspective view of FIG. 1. FIG. 4A is an exploded illustration of a torque sensing section. In FIGS. 2 to 4A, a rotating shaft and resin described later are omitted.

As illustrated in FIGS. 1 to 4B, a torque and index detection apparatus 1 according to an embodiment of the invention is a torque and index detection apparatus including a torque sensing section 4 that senses torque exerted on a connecting shaft (torsion bar) 2 connecting an input shaft (first shaft) 50a and an output shaft (not illustrated) that are rotated by a steering operation, by a pair of magnetic sensing elements 3a and 3b placed with their magnetic sensing directions opposite to each other, and a reference rotational position sensing section 5 that senses the reference rotational position of the connecting shaft 2 by the pair of magnetic sensing elements 3a and 3b of the torque sensing section 4. The reference rotational position sensing section 5 includes a pair of magnets 6 provided in the circumferential direction of the output shaft 50b with like magnetic poles facing each other, a first magnetic part 7 that is located between the pair of magnets 6 and the pair of magnetic sensing elements 3a and 3b, is provided so as to rotate integrally with the connecting shaft 2, and forms a magnetic path for magnetic flux of the pair of magnets 6 in the reference rotational position, and a second magnetic part 8 that is provided between the pair of magnetic sensing elements 3a and 3b, and passes the magnetic flux from the first magnetic part 7 uniformly to the pair of magnetic sensing elements 3a and 3b.

The input shaft 50a, the output shaft 50b, and the connecting shaft 2 form a rotating shaft 50.

As illustrated in FIGS. 1 to 4A, the torque sensing section 4 includes a torque sensing magnet 41 mounted on the input shaft, an upper and lower pair of sensing yokes 42a and 42b that are mounted on the output shaft and provided so as to surround the torque sensing magnet 41 in a non-contact manner, an upper and lower pair of magnetic collecting rings 9a and 9b that are secured with spacing around the periphery of the respective sensing yokes 42a and 42b, and an upper and lower pair of proximate sections 10a and 10b that are mounted in the circumferential direction of the respective magnetic collecting rings 9a and 9b and that respectively sandwich the magnetic sensing elements 3a and 3b that are provided between the magnetic collecting rings 9a and 9b around the periphery of the magnetic collecting rings 9a and 9b. Each of the distal ends of the magnetic sensing elements 3a and 3b points outward in the radial direction of the rings 9a and 9b. The magnetic sensing elements 3a and 3b are formed so as to come closer each other. The magnetic collecting rings 9a and 9b, the proximate sections 10a and 10b, the magnetic sensing elements 3a and 3b, and the second magnetic part 8 are integrated into a subassembly 11 by molding resin. The subassembly 11 is fixed to a housing (not illustrated).

The torque sensing magnet 41 is a cylindrical magnet having a plurality of N-poles and S-poles placed alternately at a predetermined pitch in the circumferential direction. The torque sensing magnet 41 is coaxial with the first shaft, and rotates integrally with the input shaft. In FIGS. 1 to 3, the torque sensing magnet 41 is omitted.

The sensing yokes 42a and 42b are annular rings that surround the periphery of the torque sensing magnet 41 with an appropriate narrow gap from the torque sensing magnet 41. A plurality of claws 43a are formed on the sensing yokes 42a and a plurality of claws 43b are formed on the sensing yokes 42b, at the same pitch as the placement pitch of like magnetic. poles in the torque sensing magnet 41. The sensing yokes 42a and 42b are placed at positions different from each other in the axial direction. The sensing yokes 42a and 42b are coaxial with the output shaft, and rotate integrally with the output shaft.

The sensing yokes 42a and 42b are mounted coaxially with the output shaft, with their claws 43a and 43b in the shape of an isosceles triangle shifted from each other by a half-pitch (half the pitch at which like magnetic poles are placed in the torque sensing magnet 41) in the circumferential direction. The sensing yokes 42a and 42b are used to guide magnetic flux from the torque sensing magnet 41 with a distribution that varies with twisting of the connecting shaft 2 (see FIGS. 5A and 5B).

The pair of magnetic sensing elements 3a and 3b are provided with their magnetic sensing directions opposite to each other. In other words, as illustrated in ma 4B, the magnetic sensing element 3a is placed with its sensing surface F (sensing section 13a) facing toward the proximate section 10b, and the other magnetic sensing element 3b is placed with its sensing surface F (sensing section 13b) facing toward the other proximate section 10a. While the two magnetic sensing elements 3a and 3b are placed side by side in the circumferential direction at the same position in the axial direction of the connecting shaft 2, the axial positions of their sensing surfaces F differ. In other words, one of the sensing surfaces F is placed above the center of a second transversely extended section 33 of the second magnetic part 8 described later in the axial direction of the connecting shaft 2, and the other sensing surface F is placed below the center of the second transversely extended section 33 of the second magnetic part 8. With this placement, the magnetic sensing element 3a senses magnetism that points downward along the connecting shaft 2, and the magnetic sensing element 3b senses magnetism that points upward along the connecting shaft 2.

The reference rotational position sensing section 5 according to this embodiment includes the pair of magnets 6 used for indexing that are fixed to the housing and provided below the portion between the magnetic sensing elements 3a and 3b, the first magnetic part 7 that rotates with rotation of the output shaft 50b, and the second magnetic part 8 provided in the torque sensing section 4.

The pair of magnets 6 used for indexing are provided below the magnetic sensing elements 3a and 3b, and in the circumferential direction of the output shaft 50b (direction parallel to the tangent to the connecting shaft 2) with like magnetic poles facing each other. While FIGS. 2 and 3 illustrate a case in which the N-poles are made to face each other, the S-poles may be made to face each other. As the pair of magnets 6, two identical magnets can be used.

The first magnetic part 7 is located between the pair of magnets 6 and the pair of magnetic sensing elements 3a and 3b, and is provided so as to rotate integrally with the output shaft 50b to form a magnetic path for the pair of magnets 6 in the reference rotational position. The first magnetic part 7 is formed by a rod-like member extending in the axial direction of the connecting shaft 2. The first magnetic part 7 is provided so as to be located between the pair of magnets 6 and the magnetic sensing elements 3a and 3b only once (when the rotating shaft 50 is in the reference rotational position) while the output shaft 50b makes one rotation. In other words, the first magnetic part 7 is provided so as to move close to/away from the second magnetic part 8 described later in detail only once while the connecting shaft 2 makes one rotation (when the rotating shaft 50 is in the reference rotational position).

A collar 12 is provided to the output shaft 50b of the rotating shaft 50. The collar 12 of the reference rotational position sensing section 5 is a cylinder that is mounted on the output shaft 50b and coaxial with the output shaft 50b, and rotates with rotation of the output shaft 50b. The collar 12 has an appropriate thickness in the axial direction. The first magnetic part 7 is molded from resin 14 on the output shaft 50b of the rotating shaft 50 together with the collar 12, and rotates together with the collar 12 as the rotating shaft 50 rotates.

The second magnetic part 8 is placed in the middle between the pair of magnetic sensing elements 3a and 3b, and is magnetically connected to the magnetic collecting rings 9a and 9b, the magnetic sensing elements 3a and 3b, and the proximate sections 10a and 10b which are held integrally. It should be noted that these members do not contact the rotating shaft 50, and do not rotate. The second magnetic part 8 includes a longitudinally extended section (narrow section) 31 that is located in the middle between the pair of magnetic sensing elements 3a and 3b, extends vertically along the axial direction of the connecting shaft 2, and is provided above the rotation trajectory of the first magnetic part 7, a first transversely extended section (first wide section) 32 that is extended over the pair of magnetic sensing elements 3a and 3b along the upper magnetic collecting ring 9a, at the upper end of the longitudinally extended section 31, and a second transversely extended section (second wide section) 33 that is extended in parallel to the first transversely extended section 33 toward the two magnetic sensing elements, and is formed shorter than the first transversely extended section 33, below the first transversely extended section 32.

The longitudinally extended section 31 of the second magnetic part 8 and the first magnetic part 7 may be formed at substantially the same thickness. Also, the first transversely extended section 32 and second transversely extended section 33 of the second magnetic part 8 may be formed at the same thickness as the longitudinally extended section 31.

It is preferable that the first transversely extended section 32 and the second transversely extended section 33 be extended so as to be laterally symmetrical with respect to the longitudinally extended section 31. The longitudinally extended section 31 serves to guide magnetic flux from the first magnetic part 7 to the second transversely extended section 33 and the first transversely extended section 32. The second transversely extended section 33 serves to guide this magnetic flux to the sides of the magnetic sensing elements 3a and 3b. The first transversely extended section 32 is provided for the magnetic flux from the first magnetic part 7 to pass through the magnetic sensing elements 3a and 3b in a vertically symmetrical (vertically uniform) manner. The first transversely extended section 32 is longer than the second transversely extended section 33, and is formed so as to cover the magnetic sensing elements 3a and 3b from above. In this way, the second magnetic part 8 is provided in order to introduce magnetic flux from the first magnetic part 7, and to pass the magnetic flux uniformly to the magnetic sensing elements 3a and 3b.

To facilitate passage of magnetic flux to the magnetic sensing elements 3a and 3b, the distance between the pair of magnets 6 and the first magnetic part 7, and the distance between the first magnetic part 7 and the second magnetic part 8 when the output shaft 50b is in the reference rotational position are preferably made as short as possible.

Operation of the torque and index detection apparatus 1 will be described.

First, operation of the torque sensing section 4 will be described with reference to FIGS. 5A and 5B.

Figure 5A:
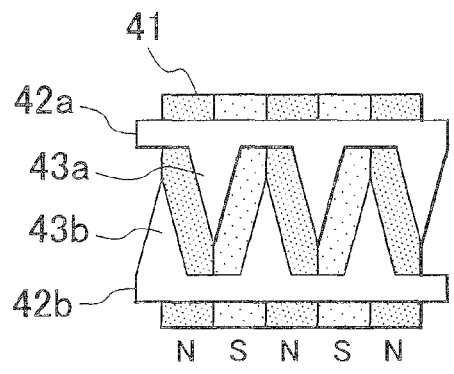
FIGS. 5A and 5B are conceptual diagrams that explain how magnetic flux varies with the shift in rotational position between a torque sensing magnet and sensing yokes illustrated in FIG. 4A.

FIG. 5A illustrates a neutral state in which the steering wheel is not steered and no torque is exerted on the connecting shaft 2. In the sensing yokes 42a and 42b, the distal ends of their respective claws 43a and 43b point to the boundary between the N-pole and S-pole of the torque sensing magnet 41. Thus, the area over which each claw 43a of the sensing yoke 42a faces the N-pole of the torque sensing magnet 41 and the area over which the claw 43a faces the S-pole are equal. Likewise, the area over which each claw 43b of the sensing yoke 42b faces the N-pole of the torque sensing magnet 41 and the area over which the claw 43b faces the S-pole are equal. In other words, since the amount of magnetic flux entering from the N-pole and the amount of magnetic flux leaving to the S-pole via the claws 43a and 43b are equal in both the sensing yokes 42a and 42b, no magnetic flux is produced between the sensing yokes 42a and 42b.

Figure 5B:
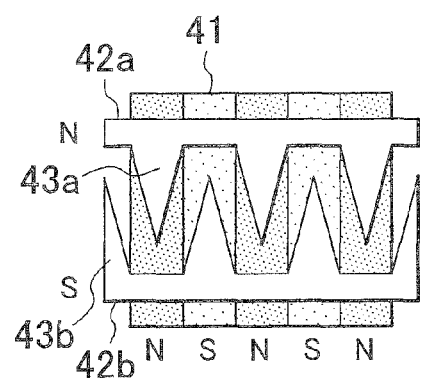

FIG. 5B illustrates a torque-applied state in which the steering wheel is steered and torque is exerted on the connecting shaft 2. As the connecting shaft 2 undergoes twisting, the relative position in the circumferential direction between the torque sensing magnet 41 mounted on the input shaft 50a and the sensing yokes 42a and 42b mounted on the output shaft 50b changes. In the sensing yoke 42a, the area over which each claw 43a faces the N-pole becomes larger than the area over which the claw 43a faces the S-pole. Therefore, the amount of magnetic flux entering from the N-pole via the claw 43a becomes larger than the amount of magnetic flux leaving to the S-pole via the claw 43a. Conversely, in the sensing yoke 42b, the area over which each claw 43b faces the N-pole becomes smaller than the area over which the claw 43b faces the S-pole. Therefore, the amount of magnetic flux entering from the N-pole via the claw 43b becomes smaller than the amount of magnetic flux leaving to the S-pole via the claw 43b. As a result, a difference in the polarity of magnetism occurs between the sensing yokes 42a and 42b, producing magnetic flux between the sensing yokes 42a and 42b. This magnetic flux is guided by the magnetic collecting rings 9a and 9b, and collected on the proximate sections 10a and 10b.

Figure 6:
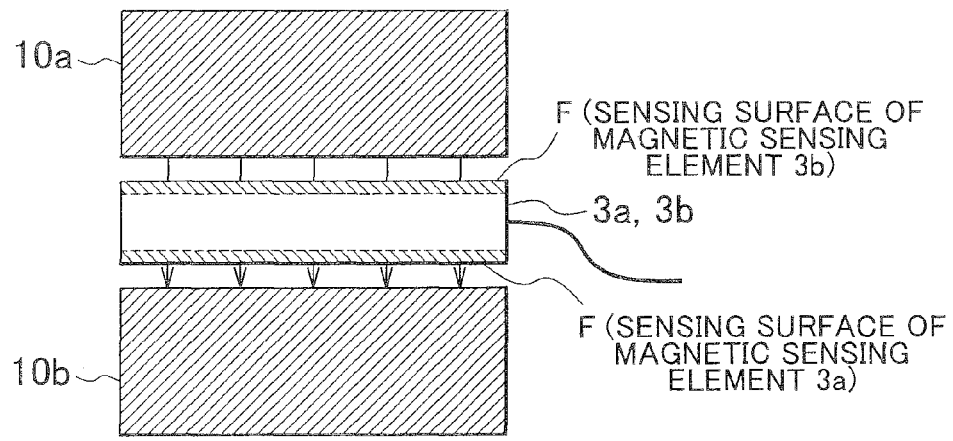
FIG. 6 is an enlarged side view of the vicinity of magnetic sensing elements which explains magnetic flux related to sensing of torque according to the embodiment of the invention.

As a result, as illustrated in FIG. 6, magnetic flux is produced between the two proximate sections 10a and 10b. The density of the produced magnetic flux (magnetic flux density) is sensed by each of the two magnetic sensing elements 3a and 3b. At this time, the magnetic flux density between the two proximate sections 10a and 10b while the state changes from FIG. 5A to FIG. 5B is proportional to the positional shift in the circumferential direction between the torque sensing magnet 41 and the sensing yokes 42a and 42b, in other words, the magnitude of twisting of the connecting shaft 2. In other words, the output of each of the magnetic sensing elements 3a and 3b is proportional to the torque exerted on the connecting shaft 2.

Figure 7:
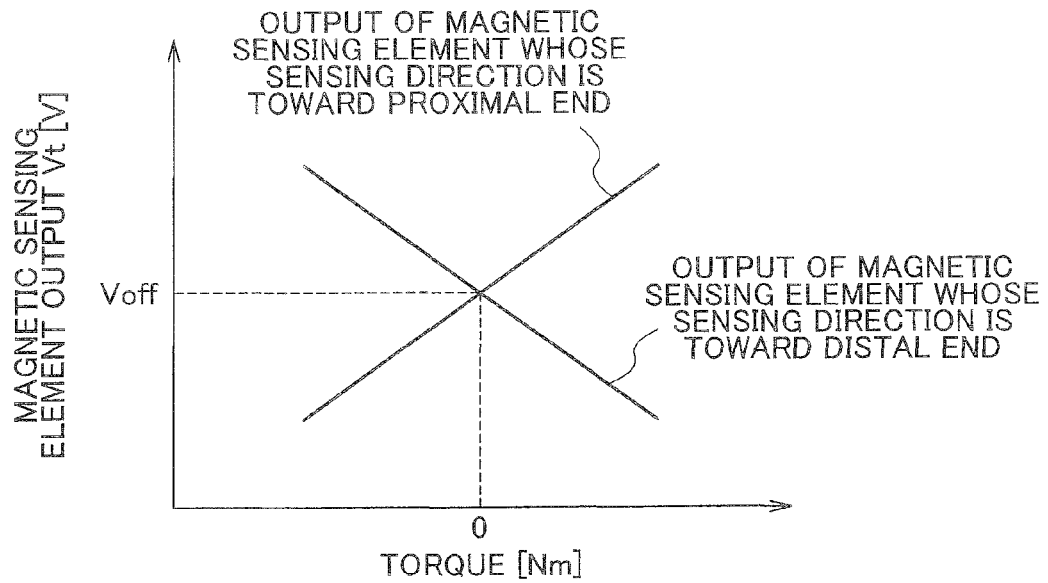
FIG. 7 is a torque-to-magnetic sensing element output characteristic diagram that illustrates the relationship between torque exerted on a connecting shaft and output of each of magnetic sensing elements according to the embodiment of the invention.

FIG. 7 illustrates variation in output $V_t$ of each of the magnetic sensing elements 3a and 3b with respect to torque exerted on the connecting shaft 2. It is assumed that the first magnetic part 7 is positioned sufficiently away from the magnetic sensing elements 3a and 3b, and that there is no influence of magnetic flux from the first magnetic part 7 through the pair of magnets 6. Since the magnetic sensing elements 3a and 3b each output the sensed magnetic flux density as a voltage, an output $V_t$ proportional to torque is obtained. Let $V_{off}$ represent the value of the output $V_t$ in the neutral state when no torque is exerted on the connecting shaft 2. Since the sensing directions of the two magnetic sensing elements 3a and 3b are opposite to each other, the sensed outputs increase/decrease in opposite directions. In other words, supposing that the graph of the output of the magnetic sensing element 3b whose sensing direction is toward the proximal end (upward direction in FIGS. 4A and 4B) rises to the right, the graph of the output of the magnetic sensing element 3a whose sensing direction is toward the distal end (downward direction in FIGS. 4A and 4B) falls to the right.

In this way, the torque sensing section 4 can sense a signal indicating torque.

Next, operation of the reference rotational position sensing section 5 will be described.

When the output shaft 50b is in the reference rotational position, the first magnetic part 7 is located below the longitudinally extended section 31 of the second magnetic part 8, and the amount of magnetic flux guided to the magnetic sensing elements 3a and 3b from the pair of magnets 6 used for indexing becomes maximum.

Figure 8:
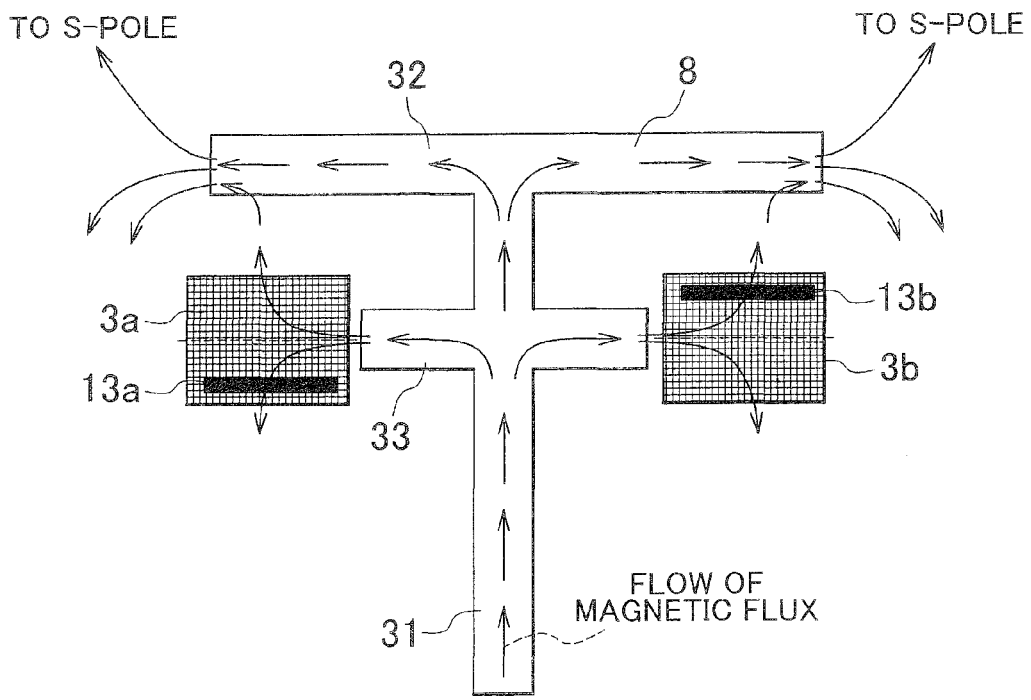
FIG. 8 is a diagram that illustrates the flow of magnetic flux from a second magnetic part to magnetic sensing elements, according to the embodiment of the invention.
Figure 9:
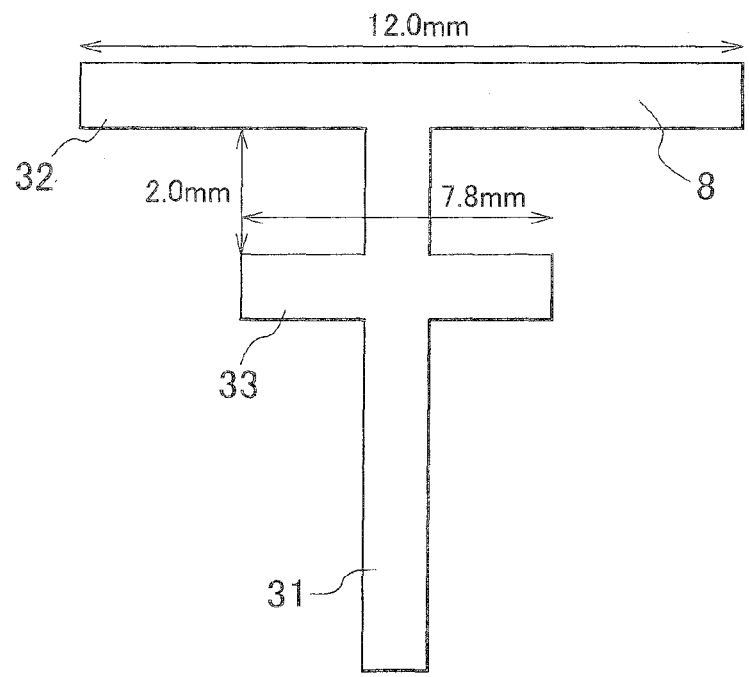
FIG. 9 is a diagram that illustrates an example of the size of the second magnetic part illustrated in FIG. 8.

Now, FIG. 8 illustrates a magnetic path through which the magnetic flux emanating from the pair of magnets 6 and having passed through the first magnetic part 7 flows from the second magnetic part 8 to the magnetic sensing elements 3a and 3b. The magnetic flux from the first magnetic part 7 flows upward from below the longitudinally extended section 31 of the second magnetic part 8, and splits uniformly to the left and right at the second transversely extended section 33 and the first transversely extended section 32. The magnetic flux passing through the second transversely extended section 33 is introduced from the sides of the magnetic sensing elements 3a and 3b, and passes through the magnetic sensing elements 3a and 3b in a vertically symmetrical manner. The dimensions of the second magnetic part 8 (such as the lengths of the first transversely extended section 32 and second transversely extended section 33) are determined so that magnetic flux passes through the magnetic sensing elements 3a and 3b in a vertically symmetrical manner. FIG. 9 illustrates an example of the size of the second magnetic part 8. In this case, for example, the pair of magnets 6 are each formed with a size of 2×2×6 mm, the first magnetic part 7 is formed with a size of 1×1×8 mm, and the second magnetic part 8 is formed with a thickness of 1 mm.

Such a magnetic path is formed in generally the same way also in the state when the first magnetic part 7 is approaching the reference rotational position. In other words, in the state illustrated in FIGS. 1 to 3 when the connecting shaft 2 (or the output shaft) is in the reference rotational position, the first magnetic part 7 is closest to the second magnetic part S that guides magnetic flux to the magnetic sensing elements 3a and 3b, so the density of magnetic flux applied to the magnetic sensing elements 3a and 3b becomes maximum.

In the reference rotational position sensing section 5, magnetic flux from the first magnetic part 7 is introduced from the sides of the magnetic sensing elements 3a and 3b, and passes in a vertically symmetrical manner. Thus, the outputs sensed by the magnetic sensing elements 3a and 3b tend to increase/decrease in the same way.

Figure 10:
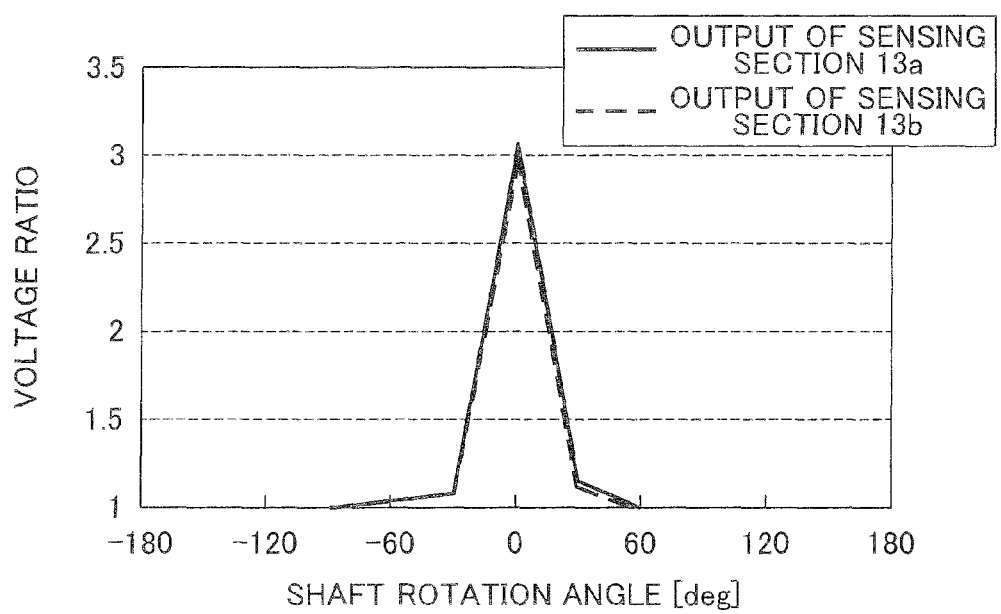
FIG. 10 is a graph that illustrates variation of output voltage (voltage ratio) of each of magnetic sensing elements during one rotation of a rotating shaft.

As illustrated in FIG. 10, when variation of output voltage of each of the magnetic sensing elements 3a and 3b with respect to rotation angle is represented as a voltage ratio with respect to the output voltage at a rotation angle of 180°, the output voltage of each of the magnetic sensing elements 3a and 3b becomes maximum in the reference rotational position, In this way, as for the rotation angle of the output shaft 50b and the output $V_i$ of each of the magnetic sensing elements 3a and 3b, the output becomes maximum when the rotation angle of the output shaft 50b is 0 degree, and decreases as the rotation angle changes in the positive direction or negative direction. In other words, when the output $V_i$ becomes the maximum value, or when the output exceeds a predetermined threshold, it can be determined that the output shaft 50b is in the reference rotational position, and the reference rotational position sensing section 5 can sense the reference rotational position.

Next, a description will be given of an operation in which sensing of torque and sensing of the reference rotational position are performed simultaneously.

The torque and index detection apparatus 1 according to the embodiment of the invention obtains a signal for sensing the reference rotational position, by using the magnetic sensing elements 3a and 3b of the torque sensing section 4. As previously mentioned, variation of magnetic flux with respect to torque is sensed as occurring in opposite directions between the magnetic sensing elements 3a and 3b. On the other hand, variation of magnetic flux with respect to reference rotational position is sensed as occurring in the same direction between the magnetic sensing elements 3a and 3b. Thus, a signal indicative of torque is obtained from the difference between the outputs of the magnetic sensing elements 3a and 3b, and a signal for sensing the reference rotational position is obtained from the sum of their outputs.

In other words, by computing Equation (1) and Equation (2) below using the outputs of the two magnetic sensing elements 3a and 3b in a computing section (not illustrated), the output $V_t$ related to torque and the output $V_i$ related to reference rotational position can be obtained.

[Equations]

$$V_t = (V_1 - V_2)/2 - V_{off} \quad (1)$$

$$V_i = (V_1 + V_2)/2 - V_{off} \quad (2)$$

In the above equations, $V_1$ and $V_2$ denote the outputs of the magnetic sensing elements 3a and 3b, respectively. The value of each of the outputs $V_1$ and $V_2$ in the neutral state when no torque is exerted on the connecting shaft 2, and in the state when the output shaft 50b is far from the reference rotational position (has rotated by 180° from the reference rotational position) is represented as offset value $V_{off}$.

In this way, by taking the difference between the outputs $V_1$ and $V_2$ of the two magnetic sensing elements 3a and 3b, and subtracting the offset value $V_{off}$ from one-half of the difference, the output $V_t$ related to torque is obtained. Torque can be obtained by comparing a value in a memory section (not illustrated) which stores the relationship between the difference in output between the magnetic sensing elements 3a and 3b and torque, with the difference between the sensed outputs.

On the other hand, by subtracting the offset value $V_{off}$ from one-half of the sum of the outputs $V_1$ and $V_2$ of the two magnetic sensing elements 3a and 3b, the output $V_i$ with respect to reference rotational position is obtained. From the output $V_i$ related to reference rotational position, by setting an appropriate value as a threshold, it is possible to determine the presence of the connecting shaft 2 (output shaft) in the reference rotation position. Even if the offset value $V_{off}$ is altered as required, this does not compromise information about torque, and reference rotational position. In this way, torque and reference rotational position can be sensed by deriving the output $V_t$ related to torque and the output $V_i$ related to reference rotational position from the outputs $V_1$ and $V_2$ of the magnetic sensing elements 3a and 3b.

As described above, in the torque and index detection apparatus 1 according to the embodiment of the invention, the reference rotational position sensing section 5 includes the pair of magnets 6 that are provided below the pair of magnetic sensing elements 3a and 3b whose magnetic sensing directions are opposite to each other, and in the circumferential direction of the connecting shaft 2 with like magnetic poles facing each other, the first magnetic part 7 that is located between the pair of magnets 6 and the pair of magnetic sensing elements 3a and 3b, is provided so as to rotate integrally with the connecting shaft 2, and forms a magnetic path for the pair of magnets 6 in the reference rotational position, and the second magnetic part 8 that is provided between the pair of magnetic sensing elements 3a and 3b and passes magnetic flux from the first magnetic part 8 uniformly to pair of magnetic sensing elements 3a and 3b. Thus, the torque and index detection apparatus 1 that combines the functions of a torque sensor and an index sensor can be realized. Also, the torque and index detection apparatus 1 according to the embodiment makes it possible to reduce the number of parts, thus enabling cost reduction. Further, the torque and index detection apparatus 1 can contribute to compactness as compared with the case of installing a torque sensor and an index sensor together.

The non-contact structure of the reference rotational position sensing section 5 of the torque and index detection apparatus 1 means that gears are not required as in the ease of mechanical steeling angle sensors in the related art, and there is no problem of wear of parts.

Further, since both the first magnetic part 7 and the second magnetic part 8 are simple in structure and thus easy to machine, manufacturing cost can be reduced.

Furthermore, the second magnetic part 8 is shaped so as to include the longitudinally extended section 31 that is provided in the middle between the pair of magnetic sensing elements 3a and 3b, and above the rotation trajectory of the first magnetic part 7, the first transversely extended section 32 that is extended over the pair of magnetic sensing elements 3a and 3b along the upper magnetic collecting ring 9a, at the upper end of the longitudinally extended section 31, and the second transversely extended section 33 that is extended in parallel to the first transversely extended section 32 toward the two magnetic sensing elements, and is formed shorter than the first transversely extended section 32, below the first transversely extended section 32. Thus, the amounts of magnetic flux passing through the sensing sections 13a and 13b of the respective magnetic sensing elements can be made equal, and can be sensed as varying in the same direction. In contrast, as for variation of magnetic flux with respect to torque, the sensed outputs increase/decrease in opposite directions. Thus, the output related to torque and the output related to reference rotational position to be sensed separately. Therefore, as indicated by the two lines of the graphs illustrated in FIG. 10, in sensing of the reference rotational position, the responses of the pair of magnetic sensing elements 3a and 3b with respect to rotation of the output shaft 50b can be made the same, which can contribute to sensing an accurate rotation angle.

The invention is not limited to the above embodiment, and it is needless to mention that various modifications can be made without departing from the scope of the invention.

For example, while the above embodiment is directed to the case in which the pair of magnets 6 used for indexing are provided in a straight line with like magnetic poles facing each other (in such a way that in front view, the straight line connecting the pair of magnets 6 is orthogonal to the straight line passing in the middle between the pair of magnetic sensing elements 3a and 3b), the invention is not limited to this.

Figure 11:
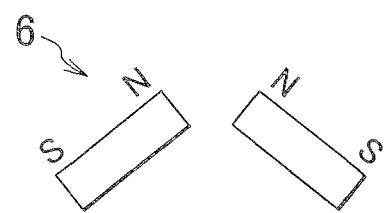
FIG. 11 is a diagram that illustrates a modification that the orientation of magnets illustrated in FIG. 2 has been altered.

Rather than being provided in a straight line, as illustrated in FIG. 11, the pair of magnets 6 may be provided in a tilted manner so as to be laterally symmetrical manner with respect to the straight line passing in between the pair of magnetic sensing elements 3a and 3b in front view.

Figure 12:
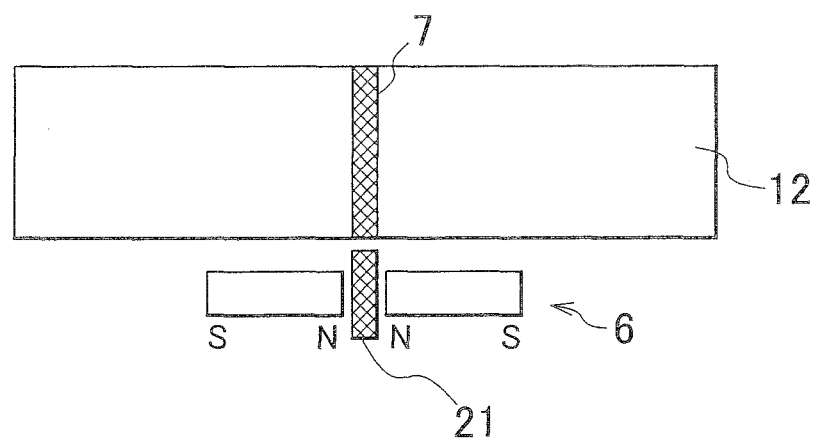
FIG. 12 is a diagram that illustrates a modification that a magnetic part is provided between the magnets illustrated in FIG. 2.

Furthermore, as illustrated in FIG. 12, a third magnetic part 21 that guides magnetic flux to the first magnetic part 7 may be placed between the pair of magnets 6. By placing the third magnetic part 21 in this way, magnetic flux can be collected on the third magnetic part 21. Thus, the amount of magnetic flux passing through the first magnetic part 7 can be increased, thereby facilitating passage of magnetic flux to the magnetic sensing elements 3a and 3b as a result.

While in the above embodiment the pair of magnetic sensing elements 3a and 3b are provided in a single location, the pair of magnetic sensing elements 3a and 3b (magnetic sensing element pair) may be provided in a plurality of locations. In this case, the second magnetic part 8 and the pair of magnets 6 may be provided in a single location with respect to one of the pairs of magnetic sensing elements 3a and 3b (magnetic sensing element pairs).

What is claimed is:

1. A torque and index detection apparatus comprising:
   a torque sensing section that senses torque exerted on a connecting shaft that connects a first shaft and a second shaft that are rotated by a steering operation, by a pair of magnetic sensing elements placed with their magnetic sensing directions opposite to each other; and
   a reference rotational position sensing section that senses a reference rotational position of the connecting shaft by the pair of magnetic sensing elements of the torque sensing section,
   wherein the reference rotational position sensing section includes
      a pair of magnets provided in a circumferential direction of the second shaft with like magnetic poles facing each other,
      a first magnetic part that is located between the pair of magnets and the pair of magnetic sensing elements, is provided so as to rotate integrally with the second shaft, and forms a magnetic path for magnetic flux of the pair of magnets in the reference rotational position, and
      a second magnetic part that is provided between the pair of magnetic sensing elements, and passes the magnetic flux from the first magnetic part uniformly to the pair of magnetic sensing elements.

2. The torque and index detection apparatus according to claim 1, wherein
   the torque sensing section includes
      a torque sensing magnet provided on the first shaft, the torque sensing magnet being a cylindrical magnet having N-poles and S-poles placed alternately at a predetermined pitch in a circumferential direction,
      a pair of magnetic yokes that are provided on the second shaft, and are provided so as to surround the torque sensing magnet to introduce magnetic flux from the torque sensing magnet in accordance with torque on the connecting shaft,
      a pair of magnetic collecting rings that are secured with spacing around a periphery of the pair of magnetic yokes, and introduce magnetic flux from the pair of magnetic yokes, and
      a pair of proximate sections that collect the magnetic flux introduced to the upper and lower pair of magnetic collecting rings onto each of the pair of magnetic sensing elements, and that are provided so as to respectively sandwich the pair of magnetic sensing elements, the pair of magnetic sensing elements being placed between the pair of magnetic collecting rings side by side in a circumferential direction of the magnetic collecting rings around the periphery of the magnetic collecting rings.

3. The torque and index detection apparatus according to claim 1, wherein
   the second magnetic part includes
      a longitudinally extended section that is provided in a middle between the pair of magnetic sensing elements, and introduces magnetic flux from the first magnetic part,
      a first transversely extended section that is extended over the magnetic sensing elements along one of the magnetic collecting rings, at one end of the longitudinally extended section, and
      a second transversely extended section that is extended in parallel to the first transversely extended section toward the pair of magnetic sensing elements.

4. The torque and index detection apparatus according to claim 3, wherein
   a sensing surface of one of the magnetic sensing elements is placed facing toward one of the magnetic collecting rings, and a sensing surface of the other of the magnetic sensing elements is placed facing toward the other of the magnetic collecting rings.

5. The torque and index detection apparatus according to claim 1, further comprising
   a third magnetic part that is placed between the pair of magnets facing each other, and guides magnetic flux to the first magnetic part.

6. The torque and index detection apparatus according to claim 1, wherein
   the reference rotational position of the connecting shaft is a position in a neutral state where the steering operation is not performed and torque is not exerted on the connecting shaft, and is a position in which the first magnetic part and the second magnetic part are closest to each other.

* * * * *